United States Patent
Hoffmann et al.

(10) Patent No.: US 8,389,431 B2
(45) Date of Patent: Mar. 5, 2013

(54) METHOD FOR TREATING SCR CATALYSTS HAVING ACCUMULATED IRON COMPOUNDS

(75) Inventors: Thies Hoffmann, Lake Wylie, SC (US); Birgit Marrino, Charlotte, NC (US)

(73) Assignee: Steag Energy Services GmbH, Essen (DE)

( * ) Notice: Subject to any disclaimer, the term of this patent is extended or adjusted under 35 U.S.C. 154(b) by 0 days.

(21) Appl. No.: 13/288,552

(22) Filed: Nov. 3, 2011

(65) Prior Publication Data

US 2012/0053046 A1 Mar. 1, 2012

Related U.S. Application Data (60) Provisional application No. 61/439,200, filed on Feb. 3, 2011.

(51) Int. Cl.
B01J 38/60 (2006.01)
(52) U.S. Cl. ............................................ 502/27; 502/26
(58) Field of Classification Search ................... 502/26, 502/27, 29
See application file for complete search history.

(56) References Cited

U.S. PATENT DOCUMENTS

| | | | |
|---|---|---|---|
| 2,380,731 A | 7/1945 | John et al. |
| 3,692,692 A | 9/1972 | Ward et at |
| 4,615,991 A | 10/1986 | Mitsuoka et al. |
| 5,260,238 A | 11/1993 | Murakawa et al. |
| 6,241,826 B1 | 6/2001 | Schlutig et al. |
| 6,299,695 B1 | 10/2001 | Gilgen |
| 6,387,836 B1 | 5/2002 | Dorr et al. |
| 7,569,506 B2 | 8/2009 | Foerster |
| 7,723,251 B2 | 5/2010 | Hartenstein et al. |
| 7,741,239 B2 | 6/2010 | Hartenstein et al. |
| 2001/0006929 A1 | 7/2001 | Budin et al. |
| 2003/0166451 A1 | 9/2003 | Koveal et al. |
| 2006/0135347 A1 | 6/2006 | Schluttig et al. |
| 2007/0161509 A1 | 7/2007 | Bruggendick et al. |
| 2008/0115800 A1 | 5/2008 | Blohm |
| 2009/0209417 A1 | 8/2009 | Bruggendick et al. |
| 2009/0239735 A1 | 9/2009 | Bruggendick et al. |
| 2010/0230359 A1 | 9/2010 | Whitehead et al. |
| 2011/0207597 A1 | 8/2011 | Tembaak et al. |

OTHER PUBLICATIONS

H.-U. Hartenstein, et al., "$SO_2/SO_3$ Conversion Rate of SCR $DeNO_x$ Catalysts—Effects on Downstream Plant Components and Remedial Measures", Proceedings of the EPRI-DOE-EPA Air Pollution Control Symposium—The Mega Symposium, vol. 2, Aug. 1999, Atlanta, GA.

"Protocol for Laboratory Testing of SCR Catalyst: 2nd Edition", by the Electric Power Research Institute, Palo Alto, CA, 2007.

D. Dux, "Operational Experience: Elevated $SO_3$ emission caused by unexpected increase in $SO_2$ to $SO_3$ conversion rate of SCR catalyst," presented at the EPRI SCR Workshop, Charlotte, NC, Nov. 11-13, 2008.

International Search Report for PCT Application No. PCT/US12/22865 to Steag Energy Services LLC, mailed May 16, 2012.

*Primary Examiner* — Edward Johnson
(74) *Attorney, Agent, or Firm* — K&L Gates LLP (57) ABSTRACT

The present disclosure relates to methods for treating deactivated SCR catalysts having an increased $SO_2/SO_3$ conversion rate as a result of the accumulation of one or more iron compounds. The methods are characterized in that the catalysts are treated with an aqueous solution of an acidic reactive salt or hydrogen fluoride, with the addition of at least one antioxidant.

20 Claims, 4 Drawing Sheets

METHOD FOR TREATING SCR CATALYSTS HAVING ACCUMULATED IRON COMPOUNDS

CROSS REFERENCE TO RELATED APPLICATIONS

The present application claims priority to U.S. Provisional Application Ser. No. 61/439,200, filed Feb. 3, 2011, the disclosure of which is incorporated in its entirety by this reference.

TECHNICAL FIELD OF THE INVENTION

The present disclosure describes novel methods for treating and regenerating selective catalytic reduction (SCR) catalysts having accumulations of one or more iron compounds.

BACKGROUND OF THE INVENTION

High temperature thermal processes, for example, generation of steam for the production of electricity in power plants utilizing fossil fuels, often create environmentally harmful by-products. These compounds, including nitrogen oxides ($NO_x$) and sulfur dioxide ($SO_2$) must be removed from the flue gases of the high temperature thermal processes before the gases are discharged into the environment, for example before exiting the power plant and contacting the environment.

Desulphurization of the flue gas, for example removal of $SO_2$, may be carried out by applying known methods in which the $SO_2$ produced in the combustion process is oxidized to $SO_3$. This is done prior to exposure of the flue gases to the reduction catalyst. The $SO_3$ may then be absorbed into alkaline solution and removed from the process, usually in the form of gypsum.

The standard for removing nitrogen oxides from flue gases is the selective catalytic reduction (SCR) process, where a reducing agent, typically ammonia, is injected and mixed into the flue gases, and sent through a catalytic reaction chamber where the catalyst facilitates the reduction of NO by the reducing agent to form elemental nitrogen ($N_2$) and water.

One undesired side reaction between the SCR catalyst and the constituents of the flue gas is the conversion of remaining $SO_2$ to $SO_3$. For example, the $SO_2$ remaining in the flue gas may be partially oxidized to $SO_3$, which may then react with water in the flue gas to produce sulfuric acid ($H_2SO_4$). Sulfuric acid in the flue gas stream may result in corrosion of steel surfaces, for example surfaces below the dew point of the sulfuric acid, in equipment downstream of the catalyst. In addition, emission of $H_2SO_4$ aerosol particles into the atmosphere may also be undesired for environmental reasons.

The catalysts, which in certain embodiments are referred to as DeNOx catalysts, may be constructed of titanium dioxide containing the oxides of transition metals, such as, for example, vanadium, molybdenum, and tungsten, to act as catalytically active components. In specific embodiments, the catalysts may be arranged on plates, in honeycomb fashion, or as a corrugated structure and are generally placed parallel to the direction of the flow of the flue gas. However, during operation of the power plant, the catalyst undergoes a loss of activity and efficiency, for example, due to plugging with fly ash and/or deactivation of the active components by certain compounds contained in the flue gas. Among these compounds are, for example, sodium (Na), potassium (K), arsenic (As), and phosphorous (P) based salts, as well as other compounds.

In addition to these compounds, iron compounds and/or iron salts may physically and chemically bond to the catalyst surface further reducing the performance of the catalyst. Research suggests that iron ions may be the main cause of the enhanced and undesired conversion of $SO_2$ to $SO_3$ during the regular operation of the SCR catalyst in the power plant. Iron contamination may come from a variety of sources, including the fuel burned in the power plant. For example, depending on the origin and age of coal, the natural iron content may range from about 5% to about 8% by weight, relative to the total amount of the mineral components in the coal.

It is generally known that during the regeneration of SCR catalysts, inorganic acids, such as sulfuric acid ($H_2SO_4$) and hydrochloric acid (HCl), may be used to clean and restore the catalyst, such as by a soaking step and a neutralizing step. Inorganic acids are typically odorless, which is another advantage to their use. Sulfuric acid, in particular, is relatively inexpensive and commercially available. In addition, sulfuric acid is also used because $SO_2$ and $SO_3$ may also be present in the flue gas and collected by the catalyst during operation in the power plant facility and when a catalyst is submerged in water or another aqueous solution, the $SO_2$ or $SO_3$ is removed from the catalyst and forms a diluted sulfuric acid solution. However, treating a catalyst with sulfuric acid has disadvantages since the $H_2SO_4$ in a diluted aqueous solution also corrodes the steel casings of the catalyst. Corrosion of the catalyst casings may also result in release of water soluble iron compounds that can penetrate the pores of the SCR catalyst, further enhancing the undesired $SO_2$ to $SO_3$ conversion process.

The removal of iron contaminants from a DeNOx catalyst has been described in U.S. Pat. No. 7,569,506 in which the catalyst is placed in a reaction solution comprising an aqueous solution of an inorganic or organic acid with the addition of one or more antioxidants. Inorganic acids, namely hydrochloric acid, phosphorus acid, nitric acid, and, in particular, sulfuric acid, are described. Organic acids, such as relatively strong organic acids, including oxalic acid, citric acid, malonic acid, formic acid, chloroacetic acid, and benzole sulfonic acid were also used. Although the methods described in this reference were effective in removing iron accumulation on the catalyst, the strong acids described in the reference also liberated iron ions from steel substrates and the steel casings of the catalyst. These iron ions can then penetrate the pores of the catalyst, potentially enhancing the undesired $SO_2$ to $SO_3$ conversion.

Thus, there is a need for alternative methods for regeneration of SCR catalysts to remove or minimize contamination by iron compounds and provide optimum DeNOx performance of the catalyst while minimizing or reducing the $SO_2$ to $SO_3$ conversion process within the flue gas stream.

BRIEF DESCRIPTION OF THE FIGURES

The following figures assist in clarifying certain embodiments of the invention but are not intended to limit the invention to the examples described in the figures, wherein.

SUMMARY OF THE INVENTION

The present disclosure provides methods of regenerating an SCR catalyst, such as a DeNOx catalyst, having an accumulation of one or more iron compounds. The method comprises treating an SCR catalyst having an accumulation of one or more iron compounds with a substantially aqueous solution comprising an acidic reactive salt or hydrogen fluoride, and at least one antioxidant, and removing at least a portion of the one or more iron compounds accumulated on the SCR catalyst.

In another embodiment, the present disclosure provides a method of regenerating a DeNOx catalyst having an accumulation of one or more iron compounds. The method comprises treating a DeNOx catalyst having an accumulation of one or more iron compounds with a substantially aqueous solution having a pH ranging from about 2.0 to about 5.0 and comprising from about 0.1% to about 4.0% by weight of an acidic reactive ammonium salt and from about 0.5% to about 2.0% by weight of ascorbic acid or derivatives thereof, removing at least a portion of the one or more iron compounds accumulated on the DeNOx catalyst, washing the treated DeNOx catalyst with water or an aqueous solution, and drying the DeNOx catalyst.

Still other embodiments of the present disclosure provide for a regenerated SCR catalyst that has been regenerated according to the methods described herein.

DETAILED DESCRIPTION OF THE INVENTION

The present disclosure provides for methods of regenerating an SCR catalyst that has become contaminated with one or more iron compounds. SCR catalysts may become contaminated with iron compounds, for example, through the burning of fossil fuels that have a high concentration of iron compounds or leaching of iron compounds from power plant components. These iron based compounds may be a main contributor to the increase of the $SO_2/SO_3$ conversion rate during the catalyst usage cycle. Iron compounds can both mechanically and/or chemically react with SCR catalysts, for example, by depositing on one or more of the surface of the catalyst or in pores of the catalyst or by entering into chemical reactions with the catalytic reactive compounds or structural components, thus resulting in diminished catalytic performance and increase in $SO_2/SO_3$ conversion rate. For example, iron compounds deposited on the catalyst or chemically reacted with the catalyst may result in the oxidation of $SO_2$ in the flue gas to $SO_3$ which can then react with water in the flue gas to form sulfuric acid. The sulfuric acid may then react with downstream components of the flue gas emission system to corrode or oxidize those components, potentially leading to component failure. Therefore, one goal of the present regeneration methods is to not only remove various contaminants responsible for the loss of catalytic activity but also maintain or decrease the $SO_2/SO_3$ conversion rate potential by removing the one or more iron compounds from the surface and pores of the catalyst during the regeneration process.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, may contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, recited herein is incorporated by reference herein but only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary non-limiting embodiments. It is understood, however, that the invention embraces numerous alternative embodiments, which may be accomplished by combining any of the different features, aspects, and embodiments described herein in any combination that one of ordinary skill in the art would find useful.

The present disclosure provides methods for treating SCR catalysts, such as DeNOx catalysts, that have become contaminated with one or more iron containing compounds. As used herein, the term "SCR catalyst" means a selective catalytic reduction catalyst designed to selectively reduce certain components in a flue gas, such as a flue gas of a power plant that is powered by the combustion of fossil fuels, bio-fuels, or combinations thereof. As used herein, the term "DeNOx catalyst" means an SCR catalyst that removes nitrous oxides from a flue gas by the selective reduction of the nitrous oxides in the presence of ammonia to give elemental nitrogen and water. As used herein, the term "iron containing compound" means an ionic iron compound, such as, but not limited to, ionic compounds formed with a ferrous ($Fe^{2+}$) ion or ionic compounds formed with a ferric ($Fe^{3+}$) ion (including mixtures of iron containing compounds). As used herein, an SCR catalyst that are contaminated with or has an accumulation of one or more iron compounds may have an iron concentration, either deposited on the catalyst or chemically reacted with the catalyst, of greater than 0.3% by weight of $Fe_2O_3$ (as measured by X-ray fluorescence) to the weight of the total catalyst material not including the metal substrate onto which a catalyst (i.e., plate type catalysts) may be incorporated. Iron concentration may be measured as $Fe_2O_3$ concentration in the catalyst using X-ray fluorescent technology, which technology may also be used to measure concentrations of other components, including $SiO_2$, $Al_2O_3$, $TiO_2$, CaO, MgO, BaO, $Na_2O$, $K_2O$, $SO_3$, $P_2O_5$, $V_2O_5$, $WO_3$, $MoO_3$, As, and $Cr_2O_3$. Other methods may be used to measure iron concentration. In specific embodiments, the SCR catalyst may have an iron concentration ranging from about 0.3% to about 12% by weight of $Fe_2O_3$ in the catalyst as measured using X-ray fluorescence.

According to one embodiment, the present disclosure provides methods of regenerating an SCR catalyst, such as a DeNOx catalyst, wherein the catalyst has an accumulation of one or more iron compounds. The method may comprise treating the SCR catalyst having the accumulation of one or more iron compounds with a substantially aqueous solution comprising an acidic reactive salt or hydrogen fluoride; and at least one antioxidant; and removing at least a portion of the one or more iron compounds accumulated on the SCR catalyst. According to these embodiments, removing at least a portion of the one or more iron compounds provides a regenerated catalyst in which the rate of oxidation of $SO_2$ to $SO_3$ in flue gas is the same or lower than the rate of oxidation of $SO_2$ to $SO_3$ in flue gas observed with a new catalyst.

In certain embodiments, the SCR catalyst may be treated with a substantially aqueous solution comprising at least one acidic reactive salt and at least one antioxidant. As used herein, the term "acidic reactive salt" means any ionic salt that forms an acidic solution when dissolved in water (i.e., an aqueous solution having a pH of less than 7.0) and in specific embodiments, any ionic salt that forms an acidic aqueous solution having a pH of less than 5.0. Examples of acidic reactive salts suitable for use in various embodiments of the present disclosure include, but are not limited to ammonium-based acidic reactive salts, such as $NH_4^+$, primary, secondary, or tertiary ammonium salts (primary, secondary or tertiary ammonium salts may be substituted with one or more alkyl group or other suitable organic group), having a suitable counterion, such as a counter anion selected from the group consisting of fluoride ($F^-$), chloride ($Cl^-$), bromide ($Br^-$), iodide ($I^-$), astatide ($At^-$), nitrate ($NO_3^-$), dihydrogen phosphate ($H_2PO_4^-$), hydrogen sulfate ($HSO_4^-$), and sulfate ($SO_4^{2-}$). In other embodiments, the acidic reactive salt may include salts of alkaline earth metals having a counterion selected from the group consisting of fluoride ($F^-$), chloride ($Cl^-$), bromide ($Br^-$), iodide ($I^-$), astatide ($At^-$), oxalate ($C_2O_4^{2-}$), nitrate ($NO_3^-$), dihydrogen phosphate ($H_2PO_4^-$), hydrogen sulfate ($HSO_4^-$), and sulfate ($SO_4^{2-}$). As used herein, the term "substantially aqueous solution" means a solution that comprises water and at least one ionic compound (such as the acidic reactive salt) or hydrogen fluoride and at least one antioxidant compound dissolved in the water in such a concentration that the solution is still free flowing as a liquid (i.e., dissolved up to the saturation point). A substantially aqueous solution may further comprise one or more other compounds such as an organic solvent, such as a polar organic solvent, for example an alcohol, provided the other compound(s) do not interfere with the ability (wettability) of the substantially aqueous solution to contact and wet the surface of the catalyst, including penetration of the solution into the pores of the catalyst. In certain embodiments, the acidic reactive salt may be an ammonium salt, such as ammonium fluoride, ammonium chloride, ammonium bromide, ammonium iodide, ammonium nitrate, ammonium sulfate or a mixture of any thereof. In specific embodiments, the acidic reactive salt may be ammonium chloride, ammonium sulfate or mixtures thereof. In certain embodiments, the substantially aqueous solution may comprise the acidic reactive salt in a concentration ranging from about 0.1% to about 10.0%. In other embodiments, the substantially aqueous solution may comprise the acidic reactive salt in a concentration ranging from about 0.1 to about 4.0% by weight, and in other embodiments from about 0.5% to about 2.0% by weight of the solution. In still other embodiments, the substantially aqueous solution may comprise sufficient acidic reactive salt to make the pH of the solution less than 5.0.

According to other embodiments, the SCR catalyst may be treated with a substantially aqueous solution comprising hydrogen fluoride and at least one antioxidant (i.e., a substantially aqueous hydrofluoric acid solution comprising at least one antioxidant). As used herein, the phrases "a substantially aqueous solution comprising hydrogen fluoride" and "a hydrofluoric acid solution" mean the same and may be used interchangeably. For example, according to these embodiments, the substantially aqueous solution may comprise hydrogen fluoride in a concentration ranging from about 0.05% to about 0.2% by weight of the solution.

In addition to the acidic reactive salt or hydrogen fluoride, the substantially aqueous solution further comprises at least one antioxidant. Suitable antioxidants may include, for example, enols or enediols such as for example ascorbic acid, carboxylic acids such as for example citric acid and hydroxycarboxylic acids such as for example tartaric acid and salicylic acid or derivatives of any of these compounds. In specific embodiments, the antioxidant may be ascorbic acid or derivatives thereof. According to these embodiments, the substantially aqueous solution may contain the antioxidant, for example ascorbic acid (or derivative thereof), in a concentration of about 0.5% to about 10.0% by weight of the solution. In other embodiments, the concentration of the antioxidant may range from about 0.5% to about 2.0% by weight of the solution.

According to the embodiments where the substantially aqueous solution comprises either an acidic reactive salt or hydrogen fluoride, the acidic reactive salt or hydrogen fluoride is added in a concentration sufficient to bring the pH of the solution to less than 5.0, for example, in some embodiments the pH range may be from about 2.0 to about 5.0.

Without intending to be bound by any theory of operation, the inventors believe that the antioxidant compound may reduce and/or bind to the one or more iron compounds that have accumulated on the catalyst, thereby forming a more soluble form of the iron compound which is then solubilized in the aqueous solution and removed from the catalyst. For example, in those embodiments where the antioxidant comprises ascorbic acid, the ascorbic acid may reduce insoluble $Fe^{3+}$ ions to $Fe^{2+}$ ions, which may then form a soluble metal/ligand complex with the ascorbic acid. In other embodiments, the antioxidant may reduce the iron compound and the reduced ion compound may form a soluble complex with a component in the substantially aqueous solution. The antioxidant/iron complex or the reduced form of iron may then be solubilized and washed away from the surface of the catalyst. However without intending to be bound by any theory, it is believed that binding, reduction and/or solubilization of the antioxidant/iron complex requires the presence of the acidic reactive salt or the hydrogen fluoride in the substantially aqueous solution. For example, in the absence of the acidic reactive salt or hydrogen fluoride, the binding constant of the antioxidant to the iron compound may not be sufficient to form a stable, soluble complex compared to the binding constant of the iron to the catalyst. That is, the binding constant of the iron to the catalyst is higher than the binding constant of the antioxidant to the iron. In particular, it is believed that when the iron is chemically bound to the catalyst surface or to a poison which itself is attached to the catalyst surface, a stronger agent, such as the acidic reactive salt or the hydrogen fluoride may be necessary to break any of such chemical, ionic or physical bonds or attractions, allowing the free iron compound to react with the antioxidant.

According to specific embodiments, treating and regenerating the SCR catalyst may be affected at any temperature suitable to remove the one or more iron compounds into the substantially aqueous solution. In one embodiment, treating the SCR catalyst with the substantially aqueous solution may be at a temperature ranging from about 0° C. to about 100° C. or even from about 0° C. to about 60° C. In another embodiment, treating the SCR catalyst with the substantially aqueous solution may be at a temperature ranging from about 20° C. to about 60° C.

Treating the catalyst with the substantially aqueous solution may involve at least partially immersing the catalyst in a tank or basin holding the substantially aqueous solution. In other embodiments, treating the catalyst with the substantially aqueous solution may include spraying the catalyst with the substantially aqueous solution. In still other embodiments, treating the catalyst with the substantially aqueous solution may flowing the solution through one or more apertures of the catalyst, for example, but not limited to the process described in U.S. Published Application No. 2008/0115800, the disclosure of which is incorporated in its entirety by this reference.

In particular embodiments, treating the SCR catalyst may comprise at least one of moving the catalyst and agitating the substantially aqueous solution, such as while the catalyst is at least partially immersed in a tank containing the substantially aqueous solution. For example, moving the catalyst and/or agitating the solution during the treating step may provide improved contact between the substantially aqueous solution and the surface of the catalyst and, therefore with the one or more iron compounds on the surface of the catalyst or chemically bonded to the catalyst. In addition, moving the catalyst and/or agitating the solution containing the catalyst may further improve removal of the one or more iron compounds by helping to dislodge fly ash particulate matter and/or the iron compound (either by itself or after forming a complex with the antioxidant) from the surface of the catalyst. According to certain embodiments, moving the catalyst may comprise at least one of raising and lowering the catalyst, moving the catalyst in one or more longitudinal, lateral, circular, or diagonal directions, pivoting the catalyst around at least one of a vertical, horizontal, or diagonal axis, or shaking or vibrating the catalyst. According to other embodiments, agitating the substantially aqueous solution may comprise at least one of stirring the solution, mixing the solution using mechanical mixers or air blowers, recirculating the solution, injecting the solution through one or more openings in the catalyst, spraying the solution on at least one surface of the catalyst, and treating the solution and the catalyst with ultrasonic or low frequency vibrations. In specific embodiments, treating the catalyst may include both moving the catalyst in the solution and agitating the solution.

As recited herein, after treating the SCR catalyst as described herein, the methods include removing at least a portion of the one or more iron compounds accumulated on the SCR catalyst. As described herein, the iron compounds may be removed after being treated with the substantially aqueous solution, such as by dissolving into the substantially aqueous solution or being dislodged into the substantially aqueous solution. As the catalyst is removed from the aqueous solution, the iron compounds and residues remain in the aqueous solution and are therefore removed from the catalyst surface. According to certain embodiments, sufficient amounts of the iron compounds may be removed from the catalyst such that the activity of the catalyst (e.g., the $SO_2/SO_3$ conversion rate potential) is regenerated to the levels present in new catalysts or lower. In specific embodiments, removing at least a portion of the one or more iron compounds results in a regenerated catalyst having less than 0.3% by weight of iron contamination, such as $Fe_2O_3$ contamination, on the catalyst surface or in the catalyst pores.

The methods according to the various embodiments described herein may further comprise subjecting the catalyst to one or more pretreatment steps. For example, in one embodiment the method may comprise a pretreatment step selected from a mechanical pretreatment step and a washing pretreatment step. Mechanical pretreatments may be designed to remove at least a portion of dust or fly ash from at least a portion of a surface of the catalyst. For example, the catalyst may be subjected to a forced air or gas cleaning step in which at least a portion of a surface of the catalyst is exposed to a stream of forced air or other gas to remove fly ash, dust, other particulate matter, and solids from the surface of the catalyst. Other mechanical pretreatment steps known in the art may also be used, such as, but not limited to, shaking, scraping, and poking to remove at least a portion of the solid particulate matter.

According to other embodiments, the method may further comprise a pretreatment step comprising washing the SCR catalyst with water (e.g., deionized water), an aqueous solution, or a polar organic solvent, for example, an alcohol solvent. For example, washing the catalyst by spraying the catalyst surface with water, an aqueous solution, or a polar organic solvent or at least partially immersing the catalyst in a container containing water, an aqueous solution, or a polar organic solvent, optionally with movement or agitation, may be used to remove dust or solids, such as fly ash solids, and water soluble compounds ($Na^+$, $K^+$, $P^{3+}$ and other soluble salts, etc.) from the surfaces of the catalyst. Alternatively, the pretreatment step may include subjecting the catalyst to a treatment as described in U.S. Published Application No. 2008/0115800.

The methods according to the various embodiments described herein may further comprise other known treating steps to regenerate the SCR catalyst. For example, other treating steps include various processes described in U.S. Pat. Nos. 6,299,695; 6,387,836; 7,723,251; and 7,741,239 and U.S. Application Publication Nos. 2007/0161509; 2009/0209417; and 2009/0239735, the disclosures of each of which are incorporated herein in their entirety by this reference.

In specific embodiments, the methods described herein may further comprise washing the SCR catalyst with water, an aqueous solution, or a polar organic solvent after treating the SCR catalyst with the substantially aqueous solution as described herein. Washing the SCR catalyst after the treating and removing steps may further remove residual iron or other contaminants on the catalyst surface, either by dissolving or dislodging the residual iron or other contaminants. The catalyst may be washed by one or more of spraying the catalyst surface with the solution, at least partial immersion into the solution (optionally with moving of the catalyst or agitation of the solution), or injecting the solution through the catalyst channels, such as described previously herein. After the washing step, the catalyst may be dried, such as by drying the catalyst in a drying oven at a temperature of at least 100° C. Alternatively, in those embodiments where the catalyst is not subjected to a washing step after the treating and removing steps, the catalyst may be dried directly after the step of removing at least a portion of the accumulated iron compounds.

After treating the catalyst according to any of the various embodiments described in detail herein, the catalyst may be optionally further regenerated, for example by impregnating the SCR catalyst with one or more catalytically active metal compounds. For example, during the intended use (i.e., removing one or more components from a power plant flue gas) and/or during various treating/regeneration processes of the catalyst, the catalytic activity of the catalyst may become diminished due to, for example, loss or deactivation of a portion of the one or more catalytically active metal compounds in the SCR catalyst. Re-impregnating the regenerated SCR catalyst may include impregnating one or more catalytically active metal compounds selected from the group consisting of vanadium compounds, molybdenum compounds, and tungsten compounds, such as oxides of these metals. In other embodiments, the regenerated SCR catalyst may further be re-calcinated, for example, to improve the mechanical strength and structural integrity of the regenerated catalyst.

According to other embodiments, the present disclosure provides a method for regenerating a DeNOx catalyst having an accumulation of one or more iron compounds. The method according to these embodiments comprises treating the DeNOx catalyst having an accumulation of one or more iron compounds with a substantially aqueous solution having a pH ranging from about 2.0 to about 5.0 and comprising from about 0.1% to about 4.0% by weight of an acidic reactive ammonium salt, such as described herein, and from about 0.5% to about 2.0% by weight of ascorbic acid or a derivative thereof; removing at least a portion of the one or more iron compounds accumulated on the DeNOx catalyst; washing the treated DeNOx catalyst with water or other aqueous solution to remove any residual iron compounds or other contaminants; and drying the DeNOx catalyst. Specific embodiments of these steps are described in detail herein.

Other embodiments provide for a regenerated SCR catalyst that has been regenerated according to any of the methods set forth herein. The methods described herein may take an SCR catalyst, such as a DeNOx catalyst, having an accumulation of one or more iron compounds, resulting in an increase in the conversion of $SO_2$ to $SO_3$ in flue gas, and regenerate the catalyst by removing at least a portion of the contaminating iron compounds, thereby decreasing the rate of conversion of $SO_2$ to $SO_3$ in flue gas. The regenerated SCR catalyst, for example a regenerated DeNOx catalyst, that have been treated according to any one of the methods described herein may demonstrate the same or even lower oxidation of $SO_2$ to $SO_3$ compared to a new catalyst. For example, according to certain embodiments, an SCR catalyst, such as a DeNOx catalyst that has been treated according to an embodiment of the present disclosure may display at least a 10% reduction of the $SO_2$ to $SO_3$ conversion rate compared to an untreated, iron contaminated catalyst. In other embodiments, the treated catalyst may display at least a 30%, 40%, 50%, 60%, or even at least a 70% reduction in the $SO_2$ to $SO_3$ conversion rate compared to the untreated, iron contaminated catalyst.

The present invention as set forth in the specification and defined by the claims will be better understood when read in conjunction with the following non-limiting exemplary examples.

EXAMPLES

Example 1

In this example, a pre-test was performed to identify potential candidates for ammonium salts based on pH of the salt-ascorbic acid mixture. The pH of substantially aqueous solutions of various ammonium acidic reactive salts were examined. The salts examined in this example were: Ammonium Chloride ($NH_4Cl$); Ammonium Fluoride ($NH_4F$); Ammonium Nitrate ($NH_4NO_3$); and Ammonium Sulfate (($NH_4)_2SO_4$).

Figure 1A:
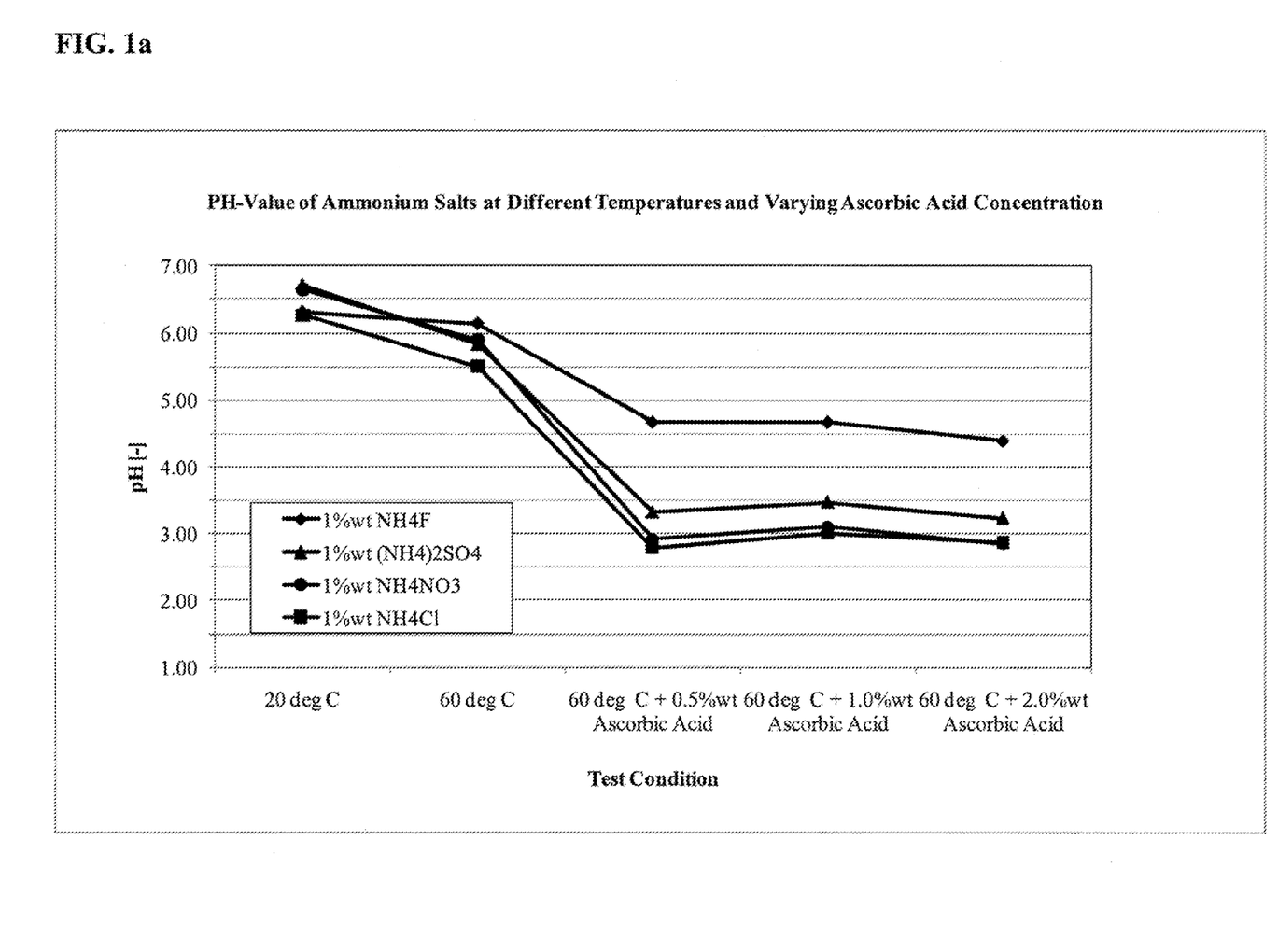
FIGS. 1a, 1b, and 1c illustrate variability of pH as a function of the concentration of ammonium salt and ascorbic acid.
Figure 1B:
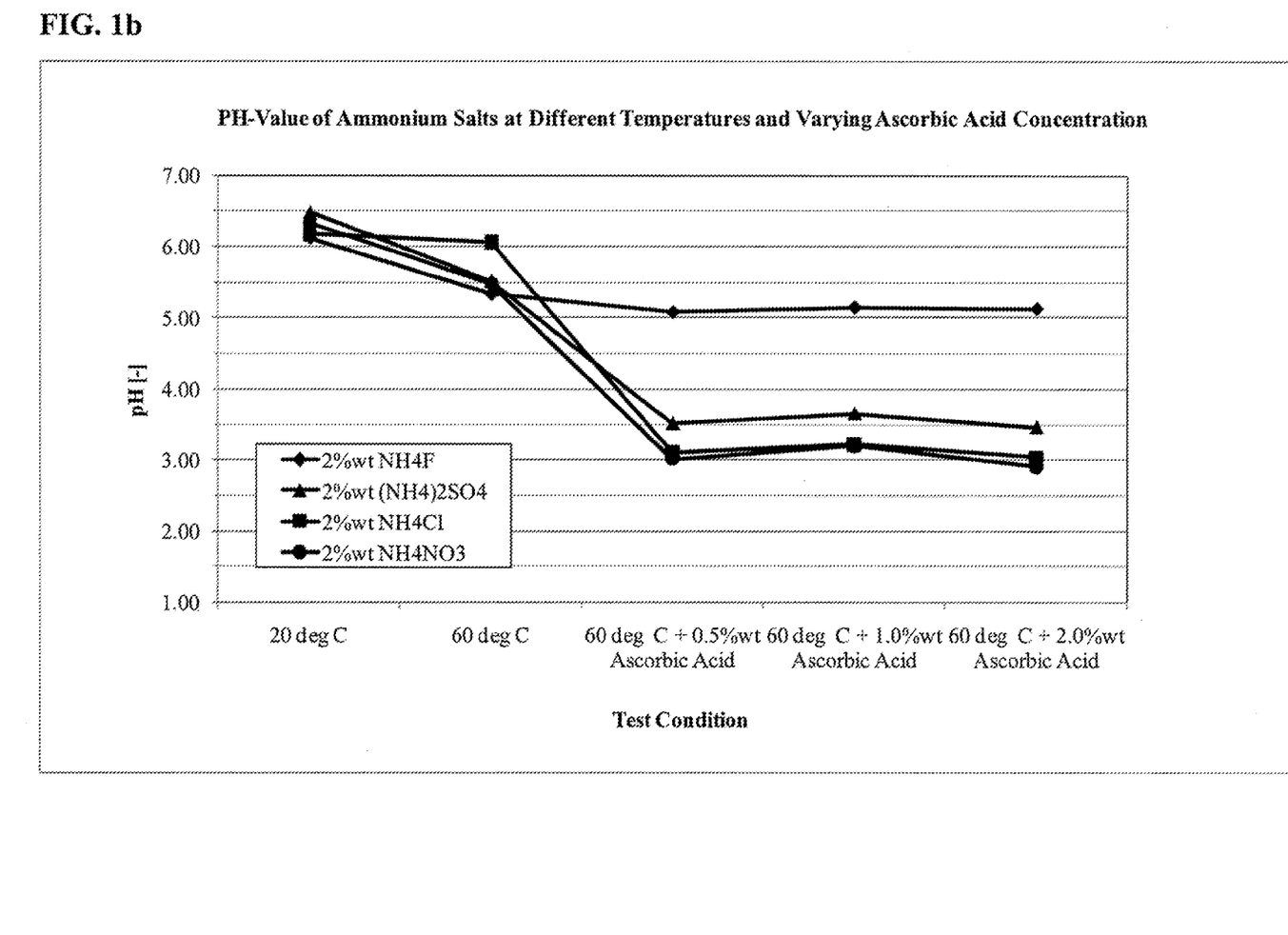
Figure 1C:
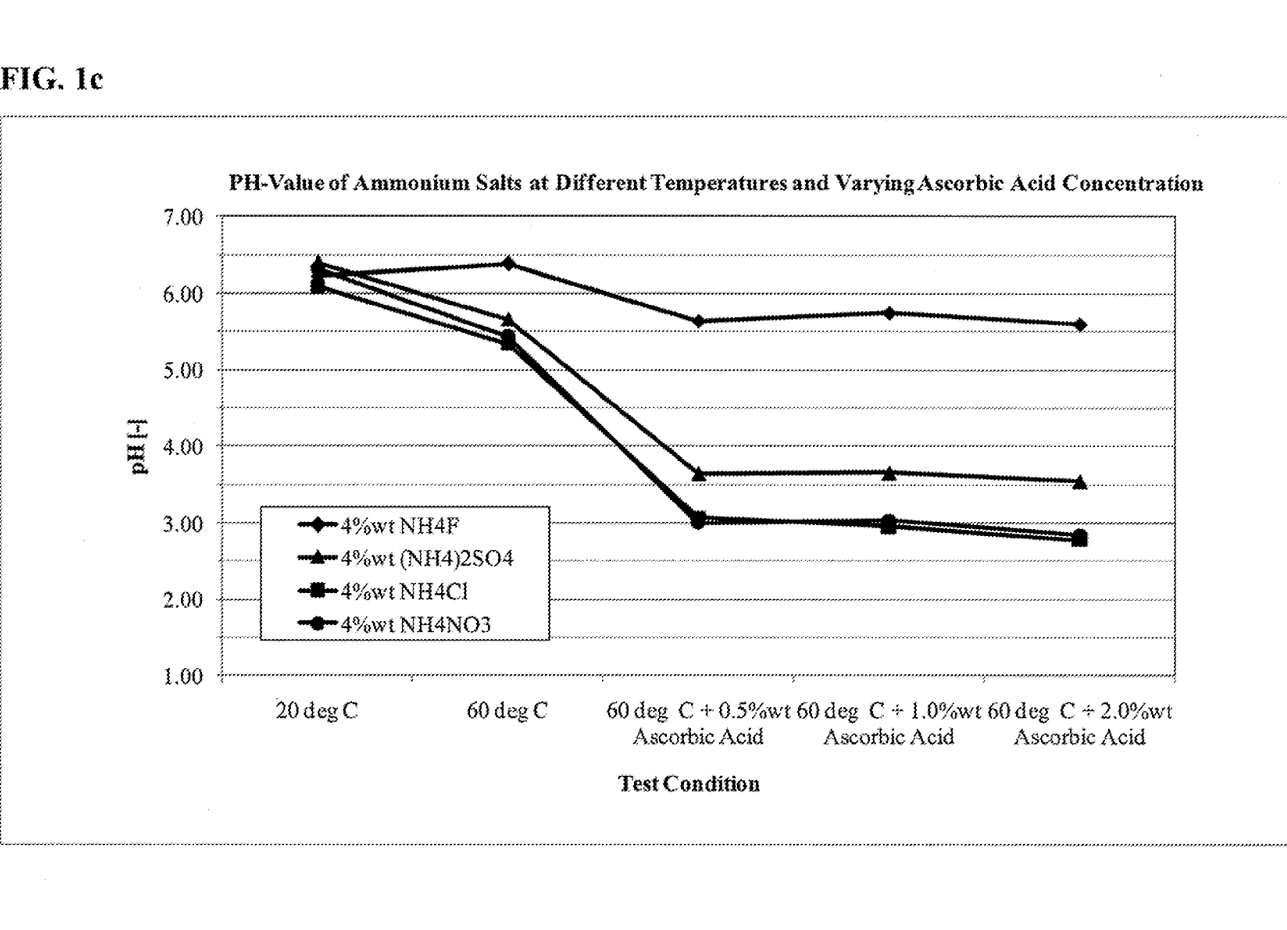

The salt concentrations were selected at 1%, 2% and 4% wt and Ascorbic Acid concentration were 0.5%, 1% and 2% wt. The effect on pH for aqueous solutions of these compositions are presented in Table 1. FIGS. 1a, 1b and 1c illustrate the effect on pH of various concentrations of ammonium salt and ascorbic acid at differing temperatures. FIG. 1a shows that after an initial addition of 0.5% wt Ascorbic Acid to a 1% salt solution the pH dropped from between 6 and 7 to between 2.5 and 3.5 for all salts and then remained almost constant even after adding up to 2% wt of Ascorbic Acid. Increasing the salt concentration further had no effect on the pH value. It can also be seen that $NH_4F$ had a significant higher pH after Ascorbic Acid addition as compared to the other salts. This effect increased with increasing $NH_4F$ concentration (compare FIGS. 1a and 1c). The lowest pH value for an ammonium fluoride solution was 4.40 for 1% $NH_4F$ and 2.0% Ascorbic Acid by weight (FIG. 1a). The lowest pH value an ammonium chloride solution was 2.78 for 4% wt $NH_4Cl$ and 2.0% wt Ascorbic Acid (FIG. 1c). A similar value of pH 2.84 was achieved with the ammonium nitrate solution containing 4% wt $NH_4NO_3$ and 2.0% wt Ascorbic Acid (FIG. 1c). Although the corresponding $(NH_4)_2SO_4$ solution (4% $(NH_4)_2SO_4$ and 2.0% wt % Ascorbic Acid) had a higher pH value of 3.55 it was decided to further investigate the acidic reactive ammonium salts $NH_4Cl$ and $(NH_4)_2SO_4$.

Example 2

A Honeycomb SCR catalyst was tested for iron removal using combinations of Ammonium Chloride, Ammonium Sulfate and Hydrogen Fluoride with Ascorbic Acid. Approximately 30 g of the Honeycomb catalyst was placed in 270 mL of the solutions of interest (see Tables 3 through 5) and heated and mixed for 4 hrs in a water bath. Samples of the solutions were taken at the beginning of the test, after 1 hr and after 4 hrs and reserved for pH, $Fe^{2+}$ and Total Iron analysis using the analytical test methods set forth in Table 2.

TABLE 1 pH-Value of Ammonium Salts at Different Temperatures and Varying Ascorbic Acid Concentration

| Condition | 1% wt $NH_4F$ pH [—] | 1% wt $NH_4Cl$ pH [—] | 1% wt $(NH_4)_2SO_4$ pH [—] | 1% wt $NH_4NO_3$ pH [—] | 2% wt $NH_4F$ pH [—] | 2% wt $NH_4Cl$ pH [—] | 2% wt $(NH_4)_2SO_4$ pH [—] | 2% wt $NH_4NO_3$ pH [—] | 4% wt $NH_4F$ pH [—] | 4% wt $NH_4Cl$ pH [—] | 4% wt $(NH_4)_2SO_4$ pH [—] | 4% wt $NH_4NO_3$ pH [—] |
|---|---|---|---|---|---|---|---|---|---|---|---|---|
| 20° C. | 6.31 | 6.26 | 6.71 | 6.65 | 6.12 | 6.18 | 6.48 | 6.34 | 6.22 | 6.09 | 6.40 | 6.32 |
| 60° C. | 6.14 | 5.50 | 5.83 | 5.90 | 5.34 | 6.06 | 5.52 | 5.48 | 6.38 | 5.34 | 5.66 | 5.43 |
| 60° C. + 0.5% wt Ascorbic Acid | 4.68 | 2.79 | 3.32 | 2.92 | 5.08 | 3.10 | 3.51 | 3.01 | 5.64 | 3.07 | 3.65 | 3.01 |

TABLE 1-continued pH-Value of Ammonium Salts at Different Temperatures and Varying Ascorbic Acid Concentration

| Condition | 1% wt NH$_4$F pH [—] | 1% wt NH$_4$Cl pH [—] | 1% wt (NH$_4$)$_2$SO$_4$ pH [—] | 1% wt NH$_4$NO$_3$ pH [—] | 2% wt NH$_4$F pH [—] | 2% wt NH$_4$Cl pH [—] | 2% wt (NH$_4$)$_2$SO$_4$ pH [—] | 2% wt NH$_4$NO$_3$ pH [—] | 4% wt NH$_4$F pH [—] | 4% wt NH$_4$Cl pH [—] | 4% wt (NH$_4$)$_2$SO$_4$ pH [—] | 4% wt NH$_4$NO$_3$ pH [—] |
|---|---|---|---|---|---|---|---|---|---|---|---|---|
| 60° C. + 1.0% wt Ascorbic Acid | 4.68 | 3.01 | 3.47 | 3.10 | 5.15 | 3.22 | 3.65 | 3.19 | 5.75 | 2.96 | 3.66 | 3.03 |
| 60° C. + 2.0% wt Ascorbic Acid | 4.40 | 2.87 | 3.23 | 2.85 | 5.13 | 3.04 | 3.46 | 2.91 | 5.60 | 2.78 | 3.55 | 2.84 |

TABLE 2

Overview of Analytical Methods

| Parameter | Manufacturer | Method | Range/Limit |
|---|---|---|---|
| pH | Accumet | Model AP85 | −2.00-16.00 pH/ Resolution 0.01 pH |
| Fe$^{2+}$ | MERCK | EM Quant 10004-1 Teststrip - visual comparison | 0, 3, 10, 25, 50, 100, 250, 500 mg/L/ 3 mg/L |
| Iron, Total | HACH | FerroVer Method Colorimetric method - photometric reading | 0 to 3.000 mg/L/ 0.03 mg/L |

As can be seen in Table 2 the range for Fe$^{2+}$ analysis is very broad while the limit for Total Iron analysis is 3.000 mg/L. Dilutions of up to 1:200 were required in order to stay within the measurement range for Total Iron analysis. As a result, the measured Total Iron values were in some cases lower than the measured Fe$^{2+}$ values. Total Iron is the sum of Fe$^{2+}$ and Fe$^{3+}$. Therefore, the Total Iron will be at least equal or greater than the Fe$^{2+}$ concentration. Certain experimental errors may be observed due to the imprecise nature of the visual comparison using Fe$^{2+}$ teststrip method and the precise but highly diluted value observed using Total Iron measurement.

Figure 2:
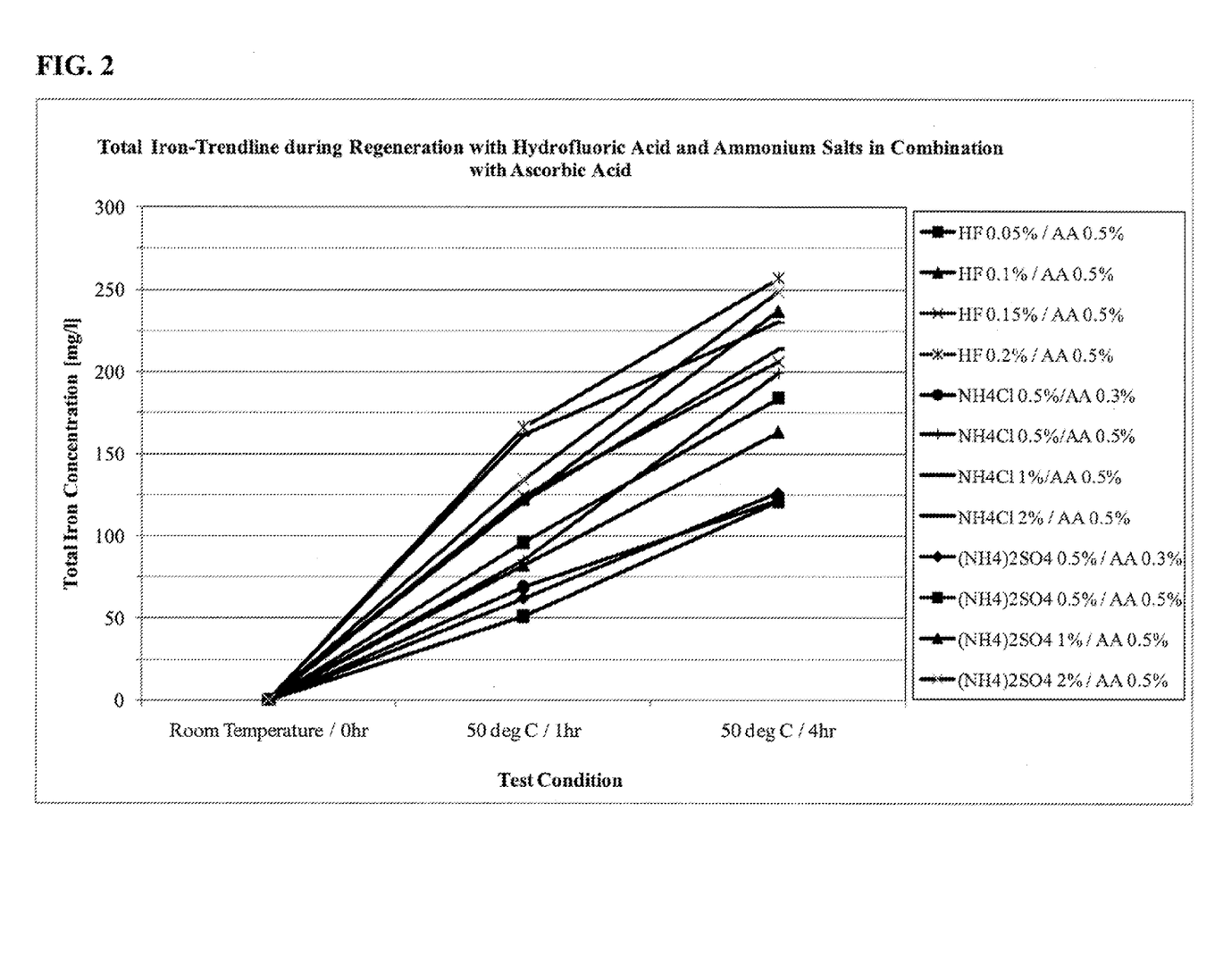
FIG. 2 illustrates the total iron concentration as a function of the concentration of acid or acid reactive component and ascorbic acid.

Results from measuring the pH, Fe$^{2+}$ concentration and Total Iron concentration from SCR catalysts treated with the formulations in this Example are presented in Tables 3, 4, and 5, respectively. In general, the increase in Total Iron concentration was proportional to the increase in Ammonium Salt concentration. Increasing the Ascorbic Acid concentration from 0.3% to 0.5% by weight resulted in an increase of the Total Iron concentration after 4 hrs from 126 mg/L to 184 mg/L (47%) for the 0.5% wt (NH$_4$)$_2$SO$_4$ solution and from 122 mg/L to 199 mg/L (64%) for the 0.5% wt NH$_4$Cl solution. The Total Iron concentration in the test solution after 4 hrs was 257 mg/L with the combination of 0.2% Hydrogen Fluoride and 0.5% Ascorbic Acid by weight. A combination of 2% (NH$_4$)$_2$SO$_4$ and 0.5% Ascorbic Acid by weight showed a Total Iron value of 249 mg/L. A concentration of 230 mg/L of Total Iron was found in the mixture of 2% NH$_4$Cl and 0.5% Ascorbic Acid by weight. A graphical representation of Total Iron concentration for the various test conditions is presented in FIG. 2.

Example 3

Determination of Change in SO$_2$ to SO$_3$ Conversion Rate

In this Example, the change in the SO$_2$ to SO$_3$ conversion rate for an SCR catalyst treated according to one embodiment of the present disclosure was determined. The SO$_2$ to SO$_3$ conversion rate of an SCR catalyst contaminated with iron was determined prior to and after treatment according to one embodiment of the present disclosure.

A sample log from a honeycomb SCR catalyst contaminated with iron was analyzed to determine the SO$_2$ to SO$_3$ conversion rate of the catalyst. The SO$_2$ to SO$_3$ conversion rate is determined according to the protocol recited in Chapter 4: SO$_2$ to SO$_3$ Oxidation of Electric Power Research Institute, "Protocol for Laboratory Testing of SCR Catalyst: 2nd Edition," D. Broske, Technical Update, December 2007, pp 4-1 to 4-11. The SO$_2$ to SO$_3$ conversion rate of the untreated sample log was determined to be 0.752%. The sample log was then treated for 3 hours in an aqueous solution comprising 2% wt. (NH$_4$)$_2$SO$_4$ and 0.5% wt. Ascorbic Acid at a temperature from 40° C. to 50° C. The sample log was then washed with deionized water for 1 hour in a cascading fashion. The Fe$^{2+}$ content of the treatment solution was measured to determine the iron removal. The iron content of the cascade wash was also analyzed to ensure that the catalyst had been thoroughly rinsed to remove the solubilized iron. The iron removal analysis data is presented in Table 6. As can be seen from the iron removal data, the Fe$^{2+}$ concentration of the treatment solution after 3 hours was 275 mg Fe$^{2+}$/L.

The sample log was then dried and calcined for 8 hours at 400°-425° C. (750°-800° F.) and the SO$_2$ to SO$_3$ conversion rate of the treated sample log was determined. The treated sample log displayed an SO$_2$ to SO$_3$ conversion rate of 0.201%, corresponding to a 73% reduction of the SO$_2$ to SO$_3$ conversion compared to the untreated iron contaminated log.

TABLE 3 pH-Value of Ammonium Salts at Different Temperatures and Varying Ascorbic Acid Concentration

| Test Condition | Test No. | | | | | | | | | | | |
|---|---|---|---|---|---|---|---|---|---|---|---|---|
| | 2&3 HF 0.05%/ AA 0.5% pH [—] | 11&12 HF 0.1%/ AA 0.5% pH [—] | 13&14 HF 0.15%/ AA 0.5% pH [—] | 15&16 HF 0.2%/ AA 0.5% pH [—] | 26&27 $NH_4Cl$ 0.5%/ AA 0.3% pH [—] | 22&23 $NH_4Cl$ 0.5%/ AA 0.5% pH [—] | 17&18 $NH_4Cl$ 1%/ AA 0.5% pH [—] | 3&4 $NH_4Cl$ 2%/ AA 0.5% pH [—] | 28&29 $(NH_4)_2SO_4$ 0.5%/ AA 0.3% pH [—] | 24&25 $(NH_4)_2SO_4$ 0.5%/ AA 0.5% pH [—] | 19&20 $(NH_4)_2SO_4$ 1%/ AA 0.5% pH [—] | 5&6 $(NH_4)_2SO_4$ 2%/ AA 0.5% pH [—] |
| RT/0 hr | 2.04 | 2.41 | 2.29 | 2.26 | 3.01 | 2.82 | 2.88 | 2.90 | 3.35 | 3.21 | 3.27 | 3.33 |
| 50° C./1 hr | 3.29 | 3.79 | 2.85 | 2.76 | 3.67 | 3.57 | 3.68 | 3.55 | 3.86 | 3.82 | 3.86 | 3.86 |
| 50° C./4 hr | 3.70 | 3.48 | 3.23 | 3.02 | 4.20 | 4.01 | 4.04 | 3.94 | 4.43 | 4.21 | 4.17 | 4.18 |

TABLE 4

Iron-Removal of Ammonium Salts at Different Temperatures and Varying Ascorbic Acid Concentration

| Test Condition | Test No. | | | | | | | | | | | |
|---|---|---|---|---|---|---|---|---|---|---|---|---|
| | 2&3 HF 0.05%/ AA 0.5% $Fe^{2+}$ [mg/L] | 11&12 HF 0.1%/ AA 0.5% $Fe^{2+}$ [mg/L] | 13&14 HF 0.15%/ AA 0.5% $Fe^{2+}$ [mg/L] | 15&16 HF 0.2%/ AA 0.5% $Fe^{2+}$ [mg/L] | 26&27 $NH_4Cl$ 0.5%/ AA 0.3% $Fe^{2+}$ [mg/L] | 22&23 $NH_4Cl$ 0.5%/ AA 0.5% $Fe^{2+}$ [mg/L] | 17&18 $NH_4Cl$ 1%/ AA 0.5% $Fe^{2+}$ [mg/L] | 3&4 $NH_4Cl$ 2%/ AA 0.5% $Fe^{2+}$ [mg/L] | 28&29 $(NH_4)_2SO_4$ 0.5%/ AA 0.3% $Fe^{2+}$ [mg/L] | 24&25 $(NH_4)_2SO_4$ 0.5%/ AA 0.5% $Fe^{2+}$ [mg/L] | 19&20 $(NH_4)_2SO_4$ 1%/ AA 0.5% $Fe^{2+}$ [mg/L] | 5&6 $(NH_4)_2SO_4$ 2%/ AA 0.5% $Fe^{2+}$ [mg/L] |
| RT/0 hr | 0 | 0 | 0 | 0 | 0 | 0 | 0 | 0 | 0 | 0 | 0 | 0 |
| 50° C./1 hr | 50 | 75 | 100 | 125 | 40 | 75 | 125 | 100 | 40 | 75 | 125 | 100 |
| 50° C./4 hr | 150 | 150 | 200 | 250 | 200 | 100 | 225 | 250 | 200 | 100 | 225 | 250 |

TABLE 5

Total Iron-Removal of Ammonium Salts at Different Temperatures and Varying Ascorbic Acid Concentration

| Test Condition | Test No. | | | | | | | | | | | |
|---|---|---|---|---|---|---|---|---|---|---|---|---|
| | 2&3 HF 0.05%/ AA 0.5% Iron Total [mg/L] | 11&12 HF 0.1%/ AA 0.5% Iron Total [mg/L] | 13&14 HF 0.15%/ AA 0.5% Iron Total [mg/L] | 15&16 HF 0.2%/ AA 0.5% Iron Total (mg/L) | 26&27 $NH_4Cl$ 0.5%/ AA 0.3% Iron Total [mg/L] | 22&23 $NH_4Cl$ 0.5%/ AA 0.5% Iron Total [mg/L] | 17&18 $NH_4Cl$ 1%/ AA 0.5% Iron Total [mg/L] | 3&4 $NH_4Cl$ 2%/ AA 0.5% Iron Total [mg/L] | 28&29 $(NH_4)_2SO_4$ 0.5%/ AA 0.3% Iron Total [mg/L] | 24&25 $(NH_4)_2SO_4$ 0.5%/ AA 0.5% Iron Total [mg/L] | 19&20 $(NH_4)_2SO_4$ 1%/ AA 0.5% Iron Total [mg/L] | 5&6 $(NH_4)_2SO_4$ 2%/ AA 0.5% Iron Total [mg/L] |
| RT/0 hr | 0 | 0 | 0 | 0 | 0 | 0 | 0 | 0 | 0 | 0 | 0 | 0 |
| 50° C./1 hr | 51 | 82 | 124 | 166 | 69 | 85 | 121 | 161 | 62 | 96 | 122 | 134 |
| 50° C./4 hr | 121 | 163 | 206 | 257 | 122 | 199 | 214 | 230 | 126 | 184 | 237 | 249 |

TABLE 6

Iron-Removal for Sample Log for $SO_2$ to $SO_3$ Conversion Rate Determination

| | pH | Temperature [° C.] | $Fe^{2+}$ [mg/L] | $SO_2 \rightarrow SO_3$ conversion |
|---|---|---|---|---|
| Treatment$_{Start}$ | 3.80 | 50 | 0 | 0.752% |
| Treatment$_{End}$ | 2.75 | 41 | 275 | |
| Cascade$_{Start}$ | 5.50 | 53 | 3 | |
| Cascade$_{End}$ | 5.40 | 48 | 15 | 0.201% |

We claim:

1. A method of regenerating an SCR catalyst having an accumulation of one or more iron compounds, the method comprising:
   treating an SCR catalyst having an accumulation of one or more iron compounds with a substantially aqueous solution comprising: an ammonium-based acidic reactive salt and at least one antioxidant; and
   removing at least a portion of the one or more iron compounds accumulated on the SCR catalyst.

2. The method of claim 1, wherein the ammonium-based acidic reactive salt is selected from the group consisting of ammonium chloride, ammonium fluoride, ammonium nitrate, ammonium sulfate, and mixtures of any thereof.

3. The method of claim 2, wherein the ammonium-based acidic reactive salt is ammonium chloride or ammonium sulfate.

4. The method of claim 2, wherein the concentration of the ammonium-based acidic reactive salt ranges from about 0.1 wt % to about 10.0 wt %.

5. The method of claim 2, wherein the substantially aqueous solution has a pH ranging from about 2.0 to about 5.0.

6. The method of claim 2, wherein the at least one antioxidant comprises ascorbic acid or derivatives thereof.

7. The method of claim 6, wherein the concentration of ascorbic acid or derivatives thereof in the substantially aqueous solution ranges from about 0.5 wt % to about 10.0 wt %.

8. The method of claim 2, wherein treating the SCR catalyst comprises treating the SCR catalyst at a temperature ranging from about 0° C. to about 100° C.

9. The method of claim 2, wherein treating the SCR catalyst further comprises at least one of moving the catalyst in the solution and agitating the substantially aqueous solution.

10. The method of claim 9, wherein moving the catalyst in the solution comprises at least one of raising and lowering the catalyst; pivoting the catalyst around a vertical, diagonal, or horizontal axis; moving the catalyst in a longitudinal direction; and shaking the catalyst; and
agitating the substantially aqueous solution comprises at least one of stirring the solution, recirculating the solution, injecting the solution through one or more openings in the catalyst, and treating the solution with ultrasonic or low frequency vibration.

11. The method of claim 2, further comprising washing the SCR catalyst with water or a third aqueous solution after the treating step and drying the SCR catalyst.

12. The method of claim 2, further comprising re-impregnating the SCR catalyst with one or more catalytic active metal compounds.

13. The method of claim 2, wherein the treated SCR catalyst has a decreased $SO_2$ to $SO_3$ conversion rate compared to the untreated SCR catalyst.

14. A method of regenerating a DeNOx catalyst having an accumulation of one or more iron compounds, the method comprising:
treating a DeNOx catalyst having an accumulation of one or more iron compounds with a substantially aqueous solution having a pH ranging from about 2.0 to about 5.0 and comprising from about 0.1% to about 4.0% by weight of an acidic reactive ammonium salt and from about 0.5% to about 2.0% by weight of ascorbic acid or derivatives thereof;
removing at least a portion of the one or more iron compounds accumulated on the DeNOx catalyst;
washing the treated DeNOx catalyst with water or an aqueous solution; and
drying the DeNOx catalyst.

15. The method of claim 14, wherein the treated DeNOx catalyst has a decreased $SO_2$ to $SO_3$ conversion rate compared to the untreated DeNOx catalyst.

16. The method of claim 14, wherein treating the DeNOx catalyst comprises treating the DeNOx catalyst at a temperature ranging from about 20° C. to about 60° C.

17. The method of claim 16, wherein treating the DeNOx catalyst comprises treating the DeNOx catalyst at a temperature of about 60° C.

18. The method of claim 8, wherein treating the SCR catalyst comprises treating the SCR catalyst at a temperature ranging from about 20° C. to about 60° C.

19. The method of claim 18, wherein treating the SCR catalyst comprises treating the SCR catalyst at a temperature of about 60° C.

20. The method of claim 1, wherein treating the SCR catalyst further comprises at least one of moving the catalyst in the solution and agitating the substantially aqueous solution,
wherein moving the catalyst in the solution comprises at least one of raising and lowering the catalyst; pivoting the catalyst around a vertical, diagonal, or horizontal axis; moving the catalyst in a longitudinal direction; and shaking the catalyst; and
agitating the substantially aqueous solution comprises at least one of stirring the solution, recirculating the solution, injecting the solution through one or more openings in the catalyst, and treating the solution with ultrasonic or low frequency vibration.

* * * * *